United States Patent [19]

Weingrad

[11] 3,943,023

[45] Mar. 9, 1976

[54] AUTOMATIC DECAL TRANSFER METHOD AND APPARATUS THEREFOR

[75] Inventor: Saul Weingrad, Hillsdale, N.J.

[73] Assignee: Commercial Decal, Inc., Mount Vernon, N.Y.

[22] Filed: Mar. 4, 1974

[21] Appl. No.: 447,687

Related U.S. Application Data

[63] Continuation of Ser. No. 145,629, May 21, 1971, abandoned.

[52] U.S. Cl. ................ 156/230; 156/235; 156/238; 156/240; 156/285; 156/322; 156/446; 156/499; 156/540

[51] Int. Cl.[2] ..... B44C 1/16; B32B 1/10; C09J 5/06; C09J 7/02

[58] Field of Search ........... 196/230, 272, 297, 285, 196/322, 540, 541, 542, 556, 566, 446, 451, 499; 156/234, 235, 238, 240

[56] References Cited

UNITED STATES PATENTS

| | | | |
|---|---|---|---|
| 1,035,914 | 8/1912 | Smith | 156/556 |
| 2,324,411 | 7/1943 | Miller et al. | 156/230 |
| 2,556,258 | 6/1951 | Denison, Jr. | 156/493 X |
| 2,667,003 | 1/1954 | Von Hofe | 156/540 |
| 2,970,076 | 1/1961 | Porth | 156/240 X |
| 3,434,902 | 3/1969 | Bliss | 156/493 X |
| R24,097 | 11/1955 | Von Hofe | 156/556 X |

*Primary Examiner*—William A. Powell
*Assistant Examiner*—Thomas Bokan
*Attorney, Agent, or Firm*—Lerner, David, Littenberg & Samuel

[57] ABSTRACT

Decalcomanias are automatically transferred from a vacuumized porous transfer surface to an object to be decorated which is held in position to assure constant non-slipping, rolling contact with the decalcomania. The porous decalcomania-holding surface coacts in transfer relation with the object to be decorated.

10 Claims, 11 Drawing Figures

AUTOMATIC DECAL TRANSFER METHOD AND APPARATUS THEREFOR

This is a continuation of application Ser. No. 145,629 filed May 21, 1971 abandoned.

BRIEF STATEMENT OF INVENTION

This invention relates to a method and apparatus for the automatic transfer of a decalcomania, hereinafter referred to as a decal, to an object to be decorated therewith. Particularly the invention relates to the automatic transfer of decals to objects to be decorated, such as glass, porcelain, porcelain on steel, pots and pans, and the like. The transfer is accomplished from a porous resilient surface on which the decal is held in a fixed position by air pressure and/or mechanical means, and the object to be decorated is contacted with the decal, usually in a rotating or rolling motion, the resilience of the transfer surface serving to insure a smooth and wrinkle-free transfer. This technique is a major departure from the direct point-to-point method hitherto used for automatic decal transfer methods.

Briefly stated, the object to be decorated, in one embodiment of the inventive concept, is held by air pressure, mechanical means, or the like, on a rotatable mandrel, and the transfer surface bearing the decal is passed in transfer relation therewith, so that the decal is smoothly and evenly applied to the object without the usual application and adjustment by hand, as is usually required with presently used decal application techniques.

DETAILED DESCRIPTION OF INVENTION

The concept of this invention will be more clearly explained by referring to the accompanying drawings which illustrate one embodiment of the inventive concept.

Figure 6:
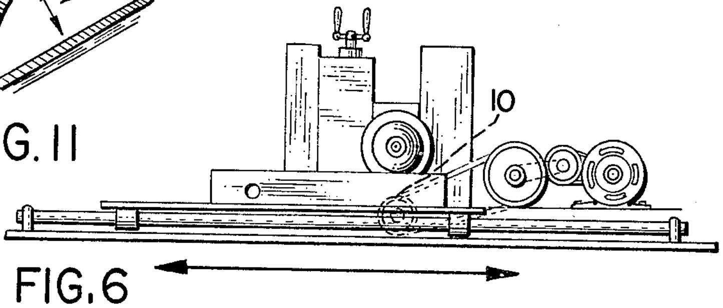
FIG. 6 is a side view of the apparatus of FIG. 4 with a mandrel adjusting mechanism.
Figure 7:
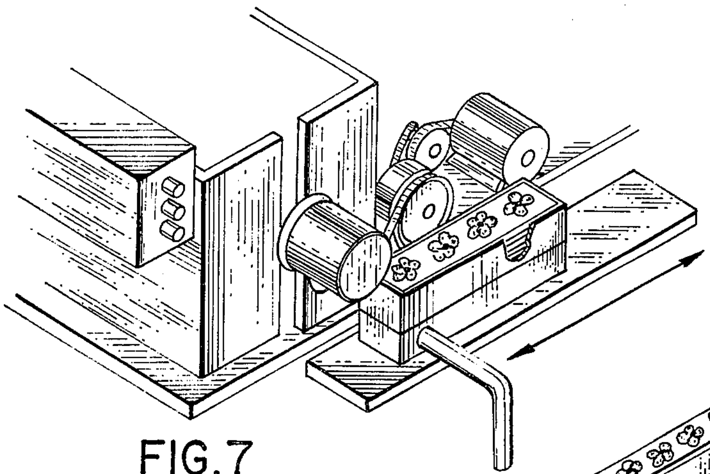
FIG. 7 is a perspective view of the apparatus showing an automatic decal feeding device in position above the transfer surface.
Figure 8:
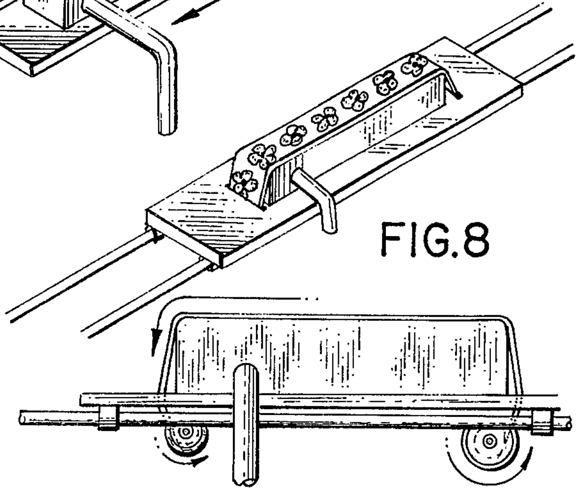
FIG. 8 is a side view of the transfer table adapted for feeding a continuous web of decals to the transfer surface.
Figure 9:
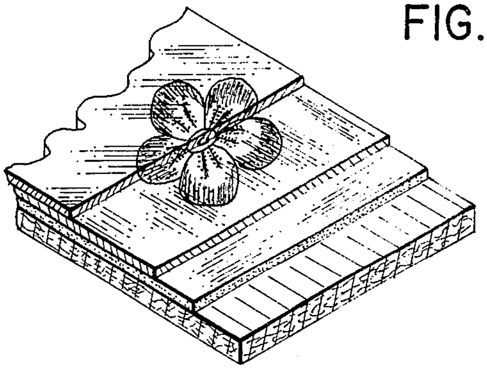
FIG. 9 is a schematic drawing of a decal suitable for use with the apparatus of FIGS. 1–8.

Turning now to the drawings, reference numeral 2 indicates generally the working components of one emmbodiment of the invention. It comprises essentially a movable table or platform 4 which is adapted to be moved in a horizontal plane by means of guide rails 6 and 8 and a gearing arrangement 10 (see FIG. 6), which is driven by motor 12 and belt drives 14 and 16.

Mounted upon table 4 is a box member 18 which is suitably connected to a pressure reducing means, such as a vacuum pump, by hose member 20.

Figure 5:
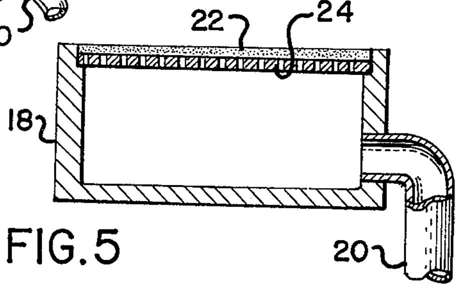
FIG. 5 is a cross-sectional view of the transfer table showing in detail a transfer surface.

The details of construction of box member 18, as shown in FIG. 5, indicates that the top surface thereof comprises a porous resilient member 22, such as a strip of felt, or other cloth material, which is, in turn, supported by a supporting member 24 such as a wire gauze, a perforated plate, or the like.

Thus, when the pressure on the interior of the box member 18 is reduced, the atmospheric pressure is exerted downwardly on the top surface of the resilient porous member 22 and holds in position any object placed thereon, such as a decal, without danger of movement or slippage under normal transfer conditions.

Disposed in a plane immediately above box member 18 is a freely rotatable mandrel or chuck member, 26. This mandrel rotates on a hollow shaft member 28 which is similarly connected to a source of reduced pressure, such as a vacuum pump, or the like. The forward portion of the mandrel is composed of a resilient material having sloping sides as shown at 30, and may be fabricated of rubber, or other relilient material, which will provide a vacuum seal to objects placed thereon, and thus will be held in fixed relation to the chuck.

Figure 11:
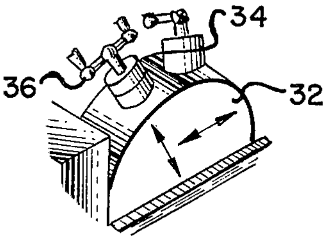
FIG. 11 is a perspective view of the mandrel adjusting mechanism of FIG. 6 in enlarged detail.

Mandrel shaft 28 is fixedly attached to a universal adjusting mechanism, shown at 32 in FIG. 11. This adjusting device, known to the art, by means of adjusting screws 34 and 36, can move mandrel shaft 28, and thus mandrel 26, vertically and horizontally with respect to resilient surface 22. Thus an object held in position on mandrel 26 by means of atmospheric pressure, may be raised or lowered with respect to the transfer surface, or may be tilted at any desired angle in order to assure optimum contact with the transfer surface, and thus with a decal held thereon.

Figure 1:
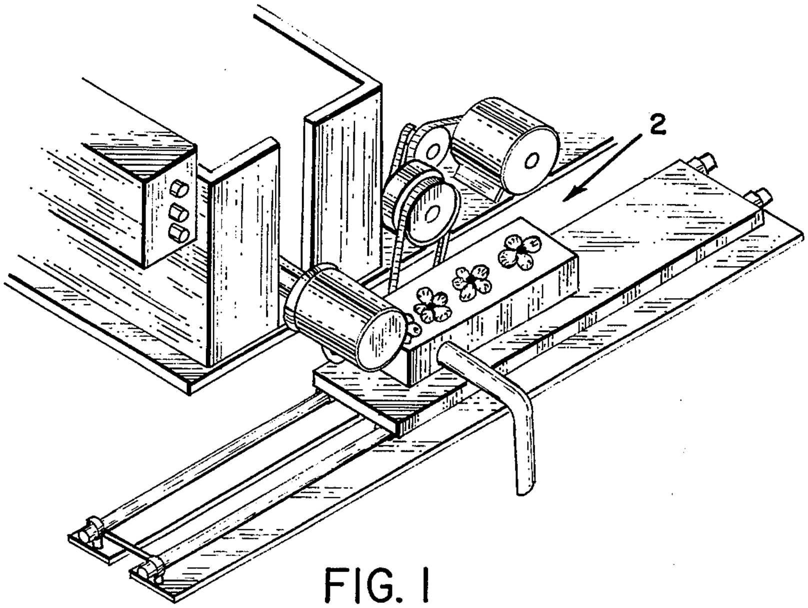
FIGS. 1–3 are perspective views showing sequentially an object in the process of being decorated.
Figure 2:
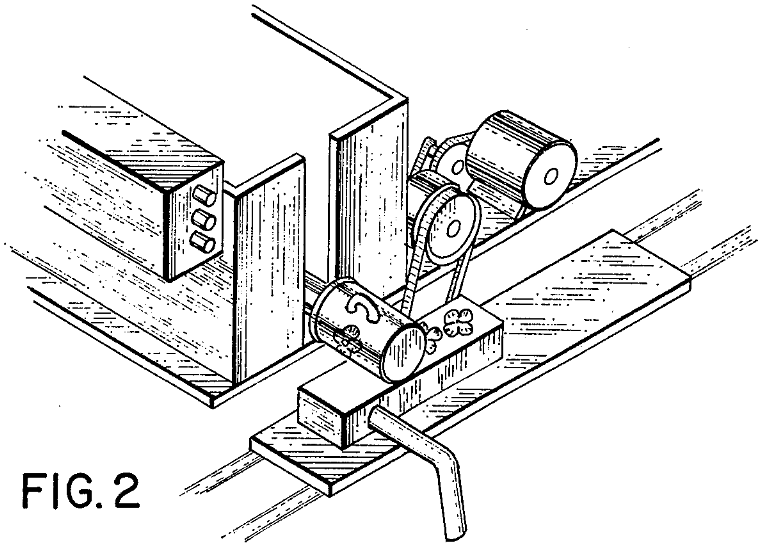
Figure 3:
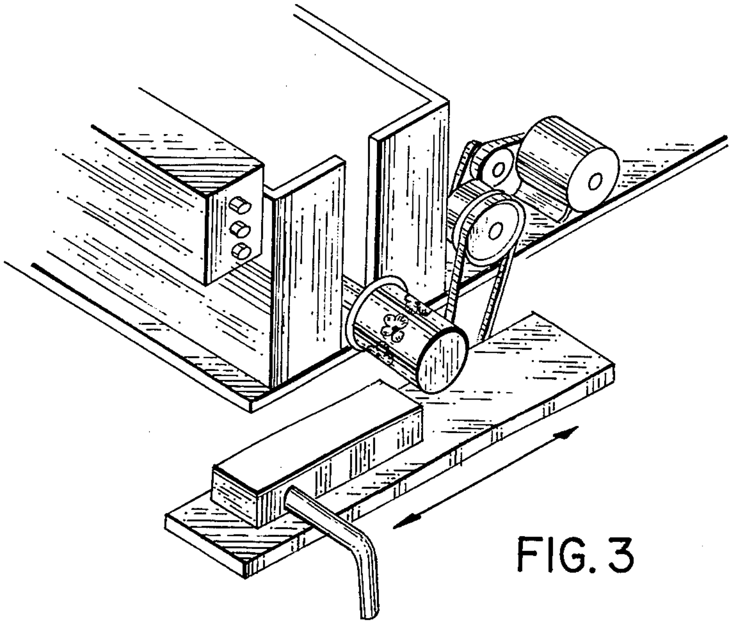
Figure 4:
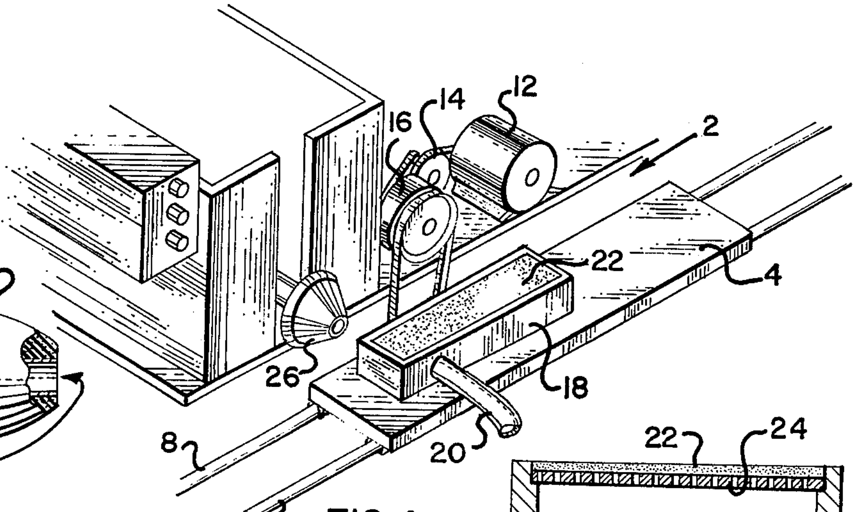
FIG. 4 is a perspective view of one embodiment of the apparatus indicating a mandrel, or chuck, for holding an object to be decorated.
Figure 10:
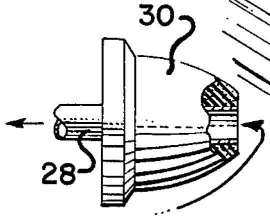
FIG. 10 is a perspective view of the mandrel, or chuck, of FIG. 4 in enlarged detail.

When an object, such as a mug or a cup to be decorated is placed on the outer end of mandrel 26, it is held in position by means of atmospheric pressure, as was explained above. It is then adjusted by means of adjusting screws 34 and 36 to the desired transfer relationship with the resilient transfer surface, 22. When a decal is placed on transfer surface 22, and transfer table 4 is moved from the right to left, as shown in FIGS. 1-3 sequentially, the cup to be decorated moves in transfer relation to the decal. If, for example, the decal is a "heat release" decal, and if the cup to be decorated is heated to, or above, the heat release temperature of the decal, the design layer of the decal will transfer to the cup smoothly and evenly without the necessity of any manual adjustment which is common practice in the prior art. With the movement of transfer surface from right to left, powered by motor 12 and its accompanying gear train, the freely rotatable cup is rolled along the decal surface and the transfer is made. Thereafter, the cup, with the decal in place thereon, is treated by methods known to the art before final use.

It is to be understood, of course, that many variations to the apparatus described are possible without departure from the concept of this invention. For example, a heating chamber with a plurality of object-holding stations may be provided for raising the temperature of the object to be decorated, such as a cup or mug, to the proper heat release temperature. In the device described, a feeding magazine for holding a stack of individual decals is shown, as well as a continuous supply roll.

It is also to be understood that the co-relation of the chuck or mandrel and the transfer surface may be varied so as to provide for a wide variety of decorative possibilities such as decorating plates, glasses, flatware, and the like. It may also be desired to provide a series of transfer stations wherein a plurality of objects may be simultaneously or sequentially decorated.

Although in the embodiment shown in the drawings the object to be decorated is held in fixed rotatable relation and the transfer surface bearing the decal is moved in transfer relation thereto, other transfer relation configurations may be designed without departing from the inventive concept. For example, the transfer surface may be held stationary and the object to be decorated rolled along the surface, thus picking up the decal. The object may also be held in a vertical posture, and the transfer surface positioned such that the decal is held in vertical relation thereto.

Many other co-acting transfer relations may be designed which incorporate the concept of this invention, namely, that of the utilization of a rolling pressurized progressive transfer in distinction to the direct point-to-point transfer methods utilized by the prior art techniques.

It is also contemplated that a decal may be removed from the transfer surface to a second transfer surface and from this second surface to the object to be decorated. This second surface may be partially shaped to more nearly conform to the object shape, and thus any distortion of the decal minimized, or at least averaged out over the total area, and thus rendered less noticeable.

To summarize briefly, this invention relates to a method and apparatus for automatically transferring a decalcomania to an object to be decorated therewith. The decal is held in position on a relilient transfer surface, by air pressure or by mechanical means, and moved in transfer relation to the object to be decorated. The heart of the inventive concept is in the application of gradual, progressive application of contact, normally a line contact, during the transfer step, thus departing from the normal point-to-point contact of prior art techniques.

What is claimed is:

1. A method for decoration of objects with decalcomanias which comprises the steps of:

holding a decalcomania in fixed relation on a porous resilient surface by means of applying reduced pressure to the opposite side of said surface, holding said object to be decorated in fixed rotational relation to said porous resilient surface, and moving said decalcomania in transfer relation with said object to be decorated, so that the design layer of said decalcomania is transferred to said object while a web portion of said decalcomania remains on said porous resilient surface during the entire transfer of said design layer to said object.

2. A method according to claim 1 wherein said porous resilient surface includes an upper surface of a felt material.

3. A method according to claim 1 wherein said porous resilient surface is moved transversely to the object to be decorated during the entire transfer of said design layer to said object.

4. A method according to claim 1 wherein said object to be decorated is a ceramic object.

5. A method according to claim 1 wherein said decalcomania is a ceramic decalcomania.

6. A method according to claim 1 wherein said object to be decorated is heated and said decalcomania is a heat releasable decalcomania.

7. An apparatus for the transfer of the design layer of decalcomanias to objects to be decorated therewith which comprises:

a porous and resilient surface for supporting said decalcomania;

means for holding said web portion of said decalcomania in position on said porous and resilient surface by applying reduced pressure therethrough during the entire transfer of said design layer of said decalcomania, said means for holding said decalcomania comprising a transversely movable table;

rotatable means for holding an object to be decorated in transfer relation to said decalcomania; and means for moving said decalcomania in transfer relation to said object, so that said design layer of said decalcomania is progressively transferred to said object, while said web portion of said decalcomania remains on said porous and resilient surface.

8. An apparatus according to claim 7 wherein said means for holding the object to be decorated includes means for adjusting the object in at least two planes.

9. An apparatus according to claim 7 including means for heating said object to be decorated.

10. An apparatus according to claim 7 wherein said decalcomania holding means includes means for automatically feeding decalcomanias to the surface thereof.

* * * * *